United States Patent
Kristen et al.

(10) Patent No.: US 10,392,455 B2
(45) Date of Patent: Aug. 27, 2019

(54) PROCESS FOR CONTROLLING THE POLYMER COMPOSITION OF AN ETHYLENE COPOLYMER OBTAINED BY A CATALYST SYSTEM COMPRISING A TRANSITION METAL CATALYST COMPONENT AND A ZIEGLER CATALYST COMPONENT

(71) Applicant: Basell Polyolefine GmbH, Wesseling (DE)

(72) Inventors: Marc Oliver Kristen, Haltern (DE); Lenka Richter-Lukesova, Hofheim/Ts. (DE)

(73) Assignee: Basell Polyolefine GmbH, Wesseling (DE)

( * ) Notice: Subject to any disclaimer, the term of this patent is extended or adjusted under 35 U.S.C. 154(b) by 241 days.

(21) Appl. No.: 14/365,182

(22) PCT Filed: Dec. 17, 2012

(86) PCT No.: PCT/EP2012/075699
§ 371 (c)(1),
(2) Date: Jun. 13, 2014

(87) PCT Pub. No.: WO2013/092453
PCT Pub. Date: Jun. 27, 2013

(65) Prior Publication Data
US 2014/0329978 A1    Nov. 6, 2014

Related U.S. Application Data

(60) Provisional application No. 61/580,081, filed on Dec. 23, 2011.

(30) Foreign Application Priority Data

Dec. 21, 2011  (EP) .................................... 11194812

(51) Int. Cl.
C08F 210/02    (2006.01)
C08F 210/16    (2006.01)
C08F 4/80      (2006.01)
C08F 4/70      (2006.01)

(52) U.S. Cl.
CPC .......... C08F 210/02 (2013.01); C08F 210/16 (2013.01); C08F 2400/02 (2013.01); C08F 2410/04 (2013.01)

(58) Field of Classification Search
USPC ......................................... 526/126, 115, 117
See application file for complete search history.

(56) References Cited

U.S. PATENT DOCUMENTS

| | | | | |
|---|---|---|---|---|
| 4,987,025 A | * | 1/1991 | Shiraki | B29C 47/0026 264/177.17 |
| 2003/0027953 A1 | * | 2/2003 | Farrer | C08F 210/16 526/110 |
| 2003/0130450 A1 | * | 7/2003 | Johnson et al. | 526/160 |

FOREIGN PATENT DOCUMENTS

| | | | |
|---|---|---|---|
| WO | WO98/42664 A1 | 10/1998 | |
| WO | WO03/010211 A1 | 2/2003 | |
| WO | WO03/044067 A1 | 5/2003 | |
| WO | WO2009/080359 A1 | 7/2009 | |
| WO | WO 2009080359 A1 * | 7/2009 | ............. C08F 10/00 |

OTHER PUBLICATIONS

PCT International Search Report & Written Opinion dated Jan. 24, 2013, for PCT/EP2012/075699.

* cited by examiner

Primary Examiner — Fred M Teskin (57) ABSTRACT

A method of controlling the polymer composition of an ethylene copolymer in a process for preparing ethylene copolymers by copolymerizing ethylene and at least one other olefin in the presence of a polymerization catalyst system comprising
at least one late transition metal catalyst component (A),
at least one Ziegler catalyst component (B), and
at least one activating compound (C)
by adding an alkyl alkoxy silane or a dialkyl ether for increasing the relative portion of the ethylene copolymer component obtained from polymerization by late transition metal catalyst component (A), or
by adding a saturated halogenated hydrocarbon for increasing the relative portion of the ethylene copolymer component obtained from polymerization by Ziegler catalyst component (B),
processes for copolymerizing ethylene and at least one other olefin in the presence of such a polymerization catalyst system comprising utilizing the controlling method, a method for altering the polymer composition of an ethylene copolymer obtained by copolymerizing ethylene and at least one other olefin in the presence of such a polymerization catalyst system and a method for transitioning from one ethylene copolymer grade to another by using the method for altering the polymer composition.

5 Claims, 1 Drawing Sheet

PROCESS FOR CONTROLLING THE POLYMER COMPOSITION OF AN ETHYLENE COPOLYMER OBTAINED BY A CATALYST SYSTEM COMPRISING A TRANSITION METAL CATALYST COMPONENT AND A ZIEGLER CATALYST COMPONENT

This application is the U.S. National Phase of PCT International Application PCT/EP2012/075699, filed Dec. 17, 2012, claiming benefit of priority to European Patent Application No. 11194812.1, filed Dec. 21, 2011, and claiming benefit of priority under 35 U.S.C. § 119(e) of U.S. Provisional Application No. 61/580,081, filed Dec. 23, 2011, the contents of which are incorporated herein by reference in their entirety.

FIELD OF THE INVENTION

The present invention relates to a method of controlling the polymer composition of an ethylene copolymer in a process for preparing ethylene copolymers by copolymerizing ethylene and at least one other olefin in the presence of a polymerization catalyst system comprising at least one late transition metal catalyst component (A), at least one Ziegler catalyst component (B), and at least one activating compound (C), to processes for copolymerizing ethylene and at least one other olefin in the presence of such a polymerization catalyst system, to a method for altering the polymer composition of an ethylene copolymer obtained by copolymerizing ethylene and at least one other olefin in the presence of such a polymerization catalyst system and to a method for transitioning from one ethylene copolymer grade to another.

BACKGROUND OF THE INVENTION

Polyethylene is the most widely used commercial polymer. It can be prepared by a couple of different processes with a broad range of achievable properties. There is however still the wish to improve the products. One measure to enhance the property balance of polyethylenes is preparing so-called bimodal or multimodal polyethylenes. Bimodal polyethylenes are usually obtained by polymerizing or copolymerizing ethylene and optionally comonomers at two different polymerization conditions, which can either arise from polymerizing in a two stage cascade polymerization process at different polymerization conditions or from using mixed or hybrid catalysts, which have different kinds of active sites on one catalyst particle (F. Alt et al., Macromol. Symp. 2001, 163, 135-143). Such polyethylenes have usually a bimodal or at least broad molecular weight distribution and have often also an optimized comonomer distribution. If using a cascade of more than two stages or a mixed catalyst with more than two different kinds of active sites the obtained polymers are no longer "bimodal". It is therefore common to utilize for such situations the term "multimodal", while however the term "multimodal" is often also used in the sense of "more than one mode" and consequently including "bimodal". In the present description the term "multimodal" is as well utilized with the latter meaning, i.e. including "bimodal".

The advantages of the approach using a mixed catalyst system for preparing multimodal polyethylenes are that it is sufficient to employ only one polymerization reactor and that the produced polyethylenes have a better homogeneity, and thus improved properties, than those resulting from a cascade process since all catalyst particles of a mixed catalyst system are polymerized at the same polymerization conditions, while in a cascade process different catalyst particles have different residence times at the different polymerization conditions and therefore different polymer compositions. However, on the other hand, in a polymerization process with a mixed catalyst system there are only limited possibilities to control the resulting polymer composition because all active sites of the mixed catalyst system undergo the same variations of the polymerization conditions.

WO 96/09328 describes an ethylene polymerization process with a mixed catalyst system comprising a metallocene catalyst component and a Ziegler catalyst component in which water and/or carbon dioxide are co-fed to the polymerization reactor to control the molecular weight distribution of the obtained polyethylene. Also WO 2007/012406 discloses a method for controlling the relative activity of different active centers of a mixed catalyst system by polymerization in the presence of water and/or carbon dioxide, in which the catalyst system comprises a late transition metal catalyst component and a catalyst component comprising cyclopentadienyl ligands.

Another type of mixed catalyst systems for olefin polymerization is described in WO 2008/125208, which teaches mixed catalyst systems comprising a Ziegler catalyst component and a late transition catalyst component for producing multimodal polyethylenes which have good mechanical properties and good processability. WO 2009/080359 discloses that such catalyst systems may be selectively controlled by varying the amount of activating compound, thus allowing controlling the molecular weight and the comonomer composition of the obtained polyethylene fractions. By utilizing an activating compound for controlling the catalyst system it is however only possible to influence the properties of the polymers produced by the Ziegler catalyst component of the mixed catalyst system. WO 2012/084774 describes that by varying the polymerization temperature it is also possible to alter the polymer composition of an ethylene copolymer obtained by such a catalyst system. However, varying the concentration of activating compound or varying the polymerization temperature may also bring about further changes in the polymerization behavior and furthermore, using these interactions for controlling the polymer composition removes them from the options for modifying the polymerization conditions and limits over-all the possibilities for influencing the polymerization.

The use of saturated halogenated hydrocarbons to enhance the activity of Ziegler catalysts is e.g. described in WO 2003/010211. Nothing is however reported about the effect of these reagents on mixed catalyst systems comprising a Ziegler catalyst component and a late transition catalyst component.

Thus, it was the object of the present invention to overcome the disadvantages of the prior art and find independent measures for controlling the resulting polymer composition of a multimodal ethylene copolymer when preparing it with a mixed catalyst system comprising a Ziegler catalyst component and a late transition catalyst component. This should be possible without drastically changing the catalysts productivity under stable operating conditions and so give more variation possibilities and flexibility for adjusting the polymerization process and provide a method for producing different ethylene copolymer compositions with one mixed catalyst system.

SUMMARY OF THE INVENTION

We have found that this object is achieved by a method of controlling the polymer composition of an ethylene copolymer in a process for preparing ethylene copolymers by copolymerizing ethylene and at least one other olefin in the presence of a polymerization catalyst system comprising at least one late transition metal catalyst component (A),
at least one Ziegler catalyst component (B), and
at least one activating compound (C)

by adding an alkyl alkoxy silane or a dialkyl ether for increasing the relative portion of the ethylene copolymer component obtained from polymerization by late transition metal catalyst component (A), or by adding a saturated halogenated hydrocarbon for increasing the relative portion of the ethylene copolymer component obtained from polymerization by Ziegler catalyst component (B).

Furthermore, we have found processes for copolymerizing ethylene and at least one other olefin in the presence of such a polymerization catalyst system comprising utilizing the controlling method, a method for altering the polymer composition of an ethylene copolymer obtained by co-polymerizing ethylene and at least one other olefin in the presence of such a polymerization catalyst system and a method for transitioning from one ethylene copolymer grade to another by using the method for altering the polymer composition.

BRIEF DESCRIPTION OF THE DRAWINGS

The features and advantages of the present invention can be better understood via the following description and the accompanying drawings, where.

DETAILED DESCRIPTION OF THE INVENTION

According to the present invention the ethylene copolymers are obtained by copolymerizing ethylene with at least one other olefin, preferably at least one 1-olefin, i.e. a hydrocarbon having terminal double bonds. Suitable other olefins can be functionalized olefinically unsaturated compounds such as ester or amide derivatives of acrylic or methacrylic acid, for example acrylates, methacrylates, or acrylonitrile. Preference is given to nonpolar olefinic compounds, including aryl-substituted 1-olefins. Particularly preferred 1-olefins are linear or branched $C_3$-$C_{12}$-1-alkenes, in particular linear $C_3$-$C_{10}$-1-alkenes such as propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various 1-olefins. Suitable olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is also possible to copolymerize ethylene with mixtures of two or more other olefins.

The polymerization catalyst system of the present invention comprises at least one late transition metal catalyst component (A), at least one Ziegler catalyst component (B), and at least one activating compound (C).

As late transition metal catalyst component (A), the polymerization catalyst system preferably comprises a late transition metal compound containing, exclusively or in combination with other ligands, ligands which coordinate to the metal in a chelating fashion via two, three or more atoms. The coordinating atoms are preferably nitrogen or phosphorus atoms. Particular preference is given to late transition metal catalyst component (A) having a tridentate ligand and especially having a tridentate ligand which bears at least two ortho, ortho'-disubstituted aryl radicals and very preferably having a bisiminopyridyl ligand bearing two ortho, ortho'-disubstituted aryl radicals. Preferred late transition metals are those of groups 8 to 10 of the Periodic Table of Elements and in particular selected from the group consisting of iron, nickel, palladium, and cobalt. Particularly preferred are catalyst components (A) based on iron or cobalt.

The late transition metal catalyst component (A) of the catalyst system of the present invention is obtained by activating a late transition metal complex of the respective ligand structure with a suitable activating agent.

Preferred late transition metal complexes for obtaining the late transition metal catalyst component (A) of the catalyst system of the present invention are iron or cobalt complexes of general formula (I)

(I)

where the substituents and indices have the following meaning.

$L^{1A}$ and $L^{2A}$ are each, independently of one another, nitrogen or phosphorus, preferably nitrogen, $E^{1A}$ to $E^{3A}$ independently of one another are carbon, nitrogen or phosphorus and preferably carbon, $R^{1A}$ to $R^{3A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, arylalkyl having from 1 to 16 carbon atoms in the alkyl part and 6 to 20 carbon atoms in the aryl part, —$NR^{4A}_2$, —$OR^{4A}$, or —$SiR^{5A}_3$ or a five-, six- or seven-membered heterocycle, which comprises at least one atom from the group consisting of nitrogen, phosphorus, oxygen and sulfur, where the radicals $R^{1A}$ to $R^{3A}$ may also be substituted by halogen, —$NR^{4A}_2$, —$OR^{4A}$, or —$SiR^{5A}_3$ and/or two radicals $R^{1A}$ to $R^{3A}$, in particular adjacent radicals, together with the atoms connecting them may be joined to form a preferably 5-, 6- or 7-membered ring or a preferably 5-, 6- or 7-membered heterocycle which comprises at least one atom selected from the group consisting of nitrogen, phosphorus, oxygen and sulfur, where $R^{4A}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part, or —$SiR^{5A}_3$ where the radicals $R^{4A}$ may also be substituted by halogen, and/or two radicals $R^{4A}$ may also be joined to form a 5-, 6- or 7-membered ring, $R^{5A}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part and/or two radicals $R^{5A}$ may also be joined to form a 5-, 6- or 7-membered ring, u independently of one another are 0 for $E^{1A}$ to $E^{3A}$ being nitrogen or phosphorus and 1 for $E^{1A}$ to $E^{3A}$ being carbon, $R^{6A}$ and $R^{7A}$ are each, independently of one another, hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and 6 to 20 carbon atoms in the aryl part, —$NR^{5A}{}_2$, or —$SiR^{4A}{}_3$, where the radicals $R^{6A}$ and $R^{7A}$ may also be substituted by halogen and/or two radicals $R^{6A}$ and $R^{7A}$, may be joined to form a preferably 5-, 6- or 7-membered ring or a preferably 5-, 6- or 7-membered heterocycle which comprises at least one atom selected from the group consisting of nitrogen, phosphorus, oxygen and sulfur, v independently of one another, are 0 or 1, and when v is 0 the bond between $L^{2A}$ and the carbon atom bearing radical $R^{6A}$ is a double bond, $R^{8A}$ to $R^{12A}$ are each, independently of one another, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6 to 20 carbon atoms in the aryl radical, halogen, —$NR^{13A}{}_2$, —$OR^{13A}$ or —$SiR^{13A}{}_3$, where the organic radicals $R^{8A}$ to $R^{12A}$ may also be substituted by halogens and/or two vicinal radicals $R^{8A}$ to $R^{12A}$ may also be joined to form a five-, six- or seven-membered ring, and/or two vicinal radicals $R^{8A}$ to $R^{12A}$ are joined to form a five-, six- or seven-membered heterocycle which comprises at least one atom selected from the group consisting of nitrogen, phosphorus, oxygen and sulfur, or $R^{10A}$ to $R^{12A}$ are, independently of one another, hydrogen, the radicals $R^{13A}$ are each, independently of one another, hydrogen, $C_1$-$C_{20}$-alkyl, $C_2$-$C_{20}$-alkenyl, $C_6$-$C_{40}$-aryl, alkylaryl having from 1 to 10 carbon atoms in the alkyl part and 6 to 20 carbon atoms in the aryl part, where the organic radicals $R^{13A}$ may also be substituted by halogens or nitrogen- and oxygen-comprising groups and two radicals $R^{13A}$ may also be joined to form a five- or six-membered ring, $M^A$ is iron or cobalt, preferably iron $X^A$ independently of one another are fluorine, chlorine, bromine, iodine, hydrogen, $C_1$-$C_{10}$-alkyl, $C_2$-$C_{10}$-alkenyl, $C_6$-$C_{40}$-aryl, arylalkyl having 1 to 16 carbon atoms in the alkyl part and 6 to 20 carbon atoms in the aryl part, —$NR^{14A}{}_2$, —$OR^{14A}$, —$SR^{14A}$, —$SO_3R^{14A}$, —$OC(O)R^{14A}$, —$CN$, —$SCN$, β-diketonate, —$CO$, $BF_4^-$, $PF_6^-$ or bulky non-coordinating anions, wherein the organic radicals $X^A$ can also be substituted by halogens and/or at least one radical $R^{14A}$, and the radicals $X^A$ are optionally bonded with one another, $R^{14A}$ independently of one another are hydrogen, $C_1$-$C_{22}$-alkyl, $C_2$-$C_{22}$-alkenyl, $C_6$-$C_{40}$-aryl, arylalkyl having 1 to 16 carbon atoms in the alkyl part and 6 to 20 carbon atoms in the aryl part, or $SiR^{15A}{}_3$, wherein the organic radicals $R^{14A}$ can also be substituted by halogens, and/or in each case two radicals $R^{14A}$ can also be bonded with one another to form a five- or six-membered ring, $R^{15A}$ independently of one another are hydrogen, $C_1$-$C_{20}$-alkyl, $C_2$-$C_{20}$-alkenyl, $C_6$-$C_{40}$-aryl, arylalkyl having 1 to 16 carbon atoms in the alkyl part and 6 to 20 carbon atoms in the aryl part, wherein the organic radicals $R^{15A}$ can also be substituted by halogens, and/or in each case two radicals $R^{15A}$ can also be bonded with one another to form a five- or six-membered ring, s is 1, 2, 3 or 4, $D^A$ is an uncharged donor and t is 0 to 4.

In general formula (I), the three atoms $E^{1A}$, $E^{2A}$ and $E^{3A}$ can be identical or different. If one of them is phosphorus, then the other two are preferably each carbon. If one of them is nitrogen, then the other two are each preferably nitrogen or carbon, in particular carbon.

In general formula (I) the respective two radicals $R^{8A}$ to $R^{12A}$ can be the same or different. Preferably both substituents $R^{8A}$ to $R^{12A}$ of formula (I) are the same.

Preferably at least one radical of the group consisting of $R^{8A}$, $R^{9A}$ and $R^{11A}$ is fluorine, chlorine, bromine, iodine, —$OR^{13A}$ or —$CF_3$.

Especially preferred late transition metal complexes for obtaining the late transition metal catalyst component (A) of the catalyst system of the present invention are iron complexes of general formula (II)

(II)

where the substituents and indices have the following meaning.

$E^{1A}$ to $E^{3A}$ independently of one another are carbon, nitrogen or phosphorus and preferably carbon, $R^{1A}$ to $R^{3A}$ are each, independently of one another, hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and 6 to 20 carbon atoms in the aryl part, —$NR^{4A}{}_2$, —$OR^{4A}$, or —$SiR^{5A}{}_3$, where the radicals $R^{1A}$ to $R^{3A}$ may also be substituted by halogen, —$NR^{4A}{}_2$, —$OR^{4A}$, or —$SiR^{5A}{}_3$ and/or two radicals $R^{1A}$ to $R^{3A}$, in particular adjacent radicals, together with the atoms connecting them may be joined to form a preferably 5-, 6- or 7-membered ring or a preferably 5-, 6- or 7-membered heterocycle which comprises at least one atom selected from the group consisting of nitrogen, phosphorus, oxygen and sulfur, where $R^{4A}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part, or —$SiR^{5A}{}_3$ where the radicals $R^{4A}$ may also be substituted by halogen, and/or two radicals $R^{4A}$ may also be joined to form a 5-, 6- or 7-membered ring, $R^{5A}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part and/or two radicals $R^{5A}$ may also be joined to form a 5-, 6- or 7-membered ring, u independently of one another are 0 for $E^{1A}$ to $E^{3A}$ being nitrogen or phosphorus and 1 for $E^{1A}$ to $E^{3A}$ being carbon, $R^{6A}$ can be identical or different and can hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and 6 to 20 carbon atoms in the aryl part, —$NR^{5A}_2$, or —$SiR^{4A}_3$, where the radicals $R^{6A}$ and $R^{7A}$ may also be substituted by halogen, $R^{8A}$ to $R^{12A}$ are each, independently of one another, $C_1$-$C_{20}$-alkyl, $C_2$-$C_{22}$-alkenyl, $C_6$-$C_{40}$-aryl, arylalkyl having from 1 to 10 carbon atoms in the alkyl radical and 6 to 20 carbon atoms in the aryl radical, halogen, —$NR^{13A}_2$, —$OR^{13A}$ or —$SiR^{13A}_3$, where the organic radicals $R^{8A}$ to $R^{12A}$ may also be substituted by halogens and/or two vicinal radicals $R^{8A}$ to $R^{12A}$ may also be joined to form a five-, six- or seven-membered ring, and/or two vicinal radicals $R^{8A}$ to $R^{12A}$ are joined to form a five-, six- or seven-membered heterocycle which comprises at least one atom selected from the group consisting of nitrogen, phosphorus, oxygen and sulfur, or $R^{10A}$ to $R^{12A}$ are, independently of one another, hydrogen, the radicals $R^{13A}$ are each, independently of one another, hydrogen, $C_1$-$C_{20}$-alkyl, $C_2$-$C_{20}$-alkenyl, $C_6$-$C_{40}$-aryl, alkylaryl having from 1 to 10 carbon atoms in the alkyl part and 6 to 20 carbon atoms in the aryl part, where the organic radicals $R^{13A}$ may also be substituted by halogens or nitrogen- and oxygen-comprising groups and two radicals $R^{13A}$ may also be joined to form a five- or six-membered ring, $X^A$ independently of one another are fluorine, chlorine, bromine, iodine, hydrogen, $C_1$-$C_{10}$-alkyl, $C_2$-$C_{10}$-alkenyl, $C_6$-$C_{40}$-aryl, arylalkyl having 1 to 16 carbon atoms in the alkyl part and 6 to 20 carbon atoms in the aryl part —$NR^{14A}_2$, —$OR^{14A}$, —$SR^{14A}$, —$SO_3R^{14A}$, —$OC(O)R^{14A}$, —$CN$, —$SCN$, β-diketonate, —$CO$, $BF_4^-$, $PF_6^-$ or bulky non-coordinating anions, wherein the organic radicals $X^A$ can also be substituted by halogens and/or at least one radical $R^{14A}$, and the radicals $X^A$ are optionally bonded with one another, $R^{14A}$ independently of one another are hydrogen, $C_1$-$C_{22}$-alkyl, $C_2$-$C_{22}$-alkenyl, $C_6$-$C_{40}$-aryl, arylalkyl having 1 to 16 carbon atoms in the alkyl part and 6 to 20-carbon atoms in the aryl part, or $SiR^{15A}_3$, wherein the organic radicals $R^{14A}$ can also be substituted by halogens, and/or in each case two radicals $R^{14A}$ can also be bonded with one another to form a five- or six-membered ring, $R^{15A}$ independently of one another are hydrogen, $C_1$-$C_{20}$-alkyl, $C_2$-$C_{20}$-alkenyl, $C_6$-$C_{40}$-aryl, arylalkyl having 1 to 16 carbon atoms in the alkyl part and 6 to 20 carbon atoms in the aryl part, wherein the organic radicals $R^{15A}$ can also be substituted by halogens, and/or in each case two radicals $R^{15A}$ can also be bonded with one another to form a five- or six-membered ring, s is 1, 2, 3 or 4, $D^A$ is an uncharged donor and t is 0 to 4.

In general formula (II), the three atoms $E^{1A}$, $E^{2A}$ and $E^{3A}$ can be identical or different. If one of them is phosphorus, then the other two are preferably each carbon. If one of them is nitrogen, then the other two are each preferably nitrogen or carbon, in particular carbon.

In general formula (II) the respective two radicals $R^{8A}$ to $R^{12A}$ can be the same or different. Preferably both substituents $R^{8A}$ to $R^{12A}$ of formula (II) are the same.

Preferably at least one radical of the group consisting of $R^{8A}$, $R^{9A}$ and $R^{11A}$ is fluorine, chlorine, bromine, iodine, —$OR^{13A}$ or —$CF_3$.

Preferred iron or cobalt compounds may be found in patent application WO 2005/103100.

Especially preferred catalysts components (A) of general formula (I) are 2,6-bis[1-(2-chloro-4,6-dimethylphenylimino)ethyl]pyridine iron(II) chloride; 2,6-bis[1-(2-chloro-6-methyl-phenylimino)ethyl]pyridine iron(II) dichloride, 2,6-bis[1-(2,6-dichlorophenylimino)ethyl]pyridine iron(II) dichloride, 2,6-bis[1-(2,4-dichloro-6-methyl-phenylimino)ethyl]pyridine iron(II) dichloride, 2,6-bis[1-(2,6-difluorophenylimino)ethyl]-pyridine iron(II) dichloride, 2,6-bis[1-(2,6-dibromophenylimino)ethyl]-pyridine iron(II) dichloride, 2,6-bis[1-(2,4,6-trimethylphenylimino)ethyl]pyridine iron(II) chloride, 2,6-bis[1-(2-fluoro-6-methylphenylimino)ethyl]pyridine iron(II) chloride or 2,6-bis[1-(2-fluoro-4,6-dimethyl-phenylimino)ethyl]pyridine iron(II) chloride or the respective dibromides or tribromides.

The preparation of suitable iron complexes is described, for example, in J. Am. Chem. Soc. 120, p. 4049 ff. (1998), J. Chem. Soc., Chem. Commun. 1998, 849, and WO 98/27124.

Ziegler catalysts components (B) are well known in the art and are described for example in ZIEGLER CATALYSTS 363-386 (G. Fink, R. Mülhaupt and H. H. Brintzinger, eds., Springer-Verlag 1995). For the purposes of the present application, the expression Ziegler catalyst also includes the catalysts referred to as Ziegler-Natta catalysts in the literature.

The Ziegler catalyst component (B) preferably comprises a solid component comprising a compound of titanium or vanadium, a compound of magnesium and optionally but preferably a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3$ Br, $Ti(OCH_3)_4$, $Ti(OC_2H_5)_4$ or $Ti(O\text{-}n\text{-}C_4H_9)_4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides, and in particular chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine, and in particular chlorine.

Possible halogen-comprising magnesium compounds are in particular magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides, $SiCl_4$ or $CCl_4$ and preferably chlorine or hydrogen chloride.

Examples of suitable halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the di($C_1$-$C_{10}$-alkyl) magnesium compounds.

It is also possible to use commercially available Ziegler catalysts as Ziegler catalysts components (B) of the polymerization catalyst system of the present invention.

Activating compounds (C) are compounds which are able to react with late transition metal catalyst component (A) and with the Ziegler catalyst component (B) to convert them into catalytically active compounds. Preferred activating compounds (C) are Lewis acids In a preferred embodiment of the present invention activating compounds (C) are strong Lewis acid compounds of the general formula (III)

$$M^C R^{1C} R^{2C} R^{3C} \quad (III)$$

wherein $M^C$ is an element of group 13 of the Periodic Table of the Elements, preferably boron, aluminium or gallium, and more preferably boron, $R^{1C}$, $R^{2C}$ and $R^{3C}$ are each, independently of one another, hydrogen, $C_1$-$C_{10}$-alkyl, $C_6$-$C_{15}$-aryl, alkylaryl, arylalkyl, haloalkyl or haloaryl having from 1 to 10 carbon atoms in the alkyl radical and from 6 to 20 carbon atoms in the aryl radical, or fluorine, chlorine, bromine or iodine, preferably a haloaryl, and more preferably pentafluorophenyl.

Further examples of strong Lewis acids are mentioned in WO 00/31090.

Suitable activating compounds (C) comprising aluminum are trialkylaluminum and compounds derived therefrom, in which an alkyl group has been replaced by an alkoxy group or by a halogen atom, for example by chlorine or bromine. The alkyl groups can be identical or different. Both linear and branched alkyl groups are possible.

Preference is given to trialkylaluminum compounds wherein the alkyl groups have from 1 to 8 carbon atoms, such as trimethylaluminum, triethylaluminum, triisobutylaluminum, trioctylaluminum, methyldiethylaluminum and mixtures thereof. According to a preferred embodiment, the activating compound (C) is selected from the group consisting of trimethylaluminum (TMA), triethylaluminum (TEA), triisobutylaluminum (TIBA) and mixtures thereof.

Suitable activating compounds (C) also include boranes and boroxins, e.g. trialkylborane, triarylborane or trimethylboroxin. Particular preference is given to boranes bearing at least two perfluorinated aryl radicals. Particular preference is given to compounds of formula (III) wherein $R^{1C}$, $R^{2C}$ and $R^{3C}$ are identical, such as triphenylborane, tris(4-fluorophenyl)borane, tris-(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris-(3,4,5 trifluorophenyl)borane. Tris(pentafluorophenyl)borane is preferably used.

Such activating compounds (C) may be prepared by reaction of aluminum or boron compounds of the formula (III) with water, alcohols, phenol derivatives, thiophenol derivatives or aniline derivatives, with the halogenated and especially the perfluorinated alcohols and phenols being of particular importance. Examples of particularly suitable compounds are pentafluorophenol, 1,1-bis(pentafluorophenyl)methanol and 4-hydroxy-2,2',3,3',4,4',5,5',6,6'-nonafluorobiphenyl. Examples of combinations of compounds of the formula (III) with Brönsted acids are first and foremost trimethylaluminum/pentafluorophenol, trimethylaluminum/1-bis(pentafluorophenyl)methanol, trimethylaluminum/4-hydroxy-2,2',3,3',4,4',5,5',6,6'-nonafluorobiphenyl, triethylaluminum/pentafluorophenol, triisobutylaluminum/pentafluorophenol and triethylaluminum/4,4'-dihydroxy-2,2',3,3',5,5',6,6'-octafluorobiphenyl hydrate.

In further suitable aluminum and boron compounds of the formula (III), $R^{1C}$ is an OH group, as in, for example, boronic acids and borinic acids, with preference being given to borinic acids having perfluorinated aryl radicals, for example $(C_6F_5)_2BOH$.

Strong Lewis acids which are suitable as activating compounds (C) also include the reaction products of a boric acid with two equivalents of an aluminum trialkyl or the reaction products of an aluminum trialkyl with two equivalents of an acidic fluorinated, preferably perfluorinated hydrocarbon compounds, such as pentafluorophenol or bis(pentafluorophenyl)borinic acid.

Further preferred activating compounds (C), which can be used together with Lewis acid compounds of the general formula (III) or in place of them are, are one or more aluminoxanes. As aluminoxanes, it is possible to use, for example, the compounds described in WO 00/31090. Particularly suitable aluminoxanes are open-chain or cyclic aluminoxane compounds of the general formula (IV) or (V)

(IV)

(V)

where

R$^{4C}$ is each, independently of one another, a C$_1$-C$_6$-alkyl group, preferably a methyl, ethyl, butyl or isobutyl group, and m is an integer from 1 to 40, preferably from 4 to 25.

A particularly suitable aluminoxane compound is methylaluminoxane.

These oligomeric aluminoxane compounds are usually prepared by controlled reaction of a solution of trialkylaluminum, preferably trimethylaluminum, with water. In general, the oligomeric aluminoxane compounds obtained in this way are present as mixtures of both linear and cyclic chain molecules of various lengths, so that 1 is to be regarded as an average. The aluminoxane compounds can also be present in admixture with other metal alkyls, usually with aluminum alkyls.

Furthermore, modified aluminoxanes in which some of the hydrocarbon radicals have been replaced by hydrogen atoms or alkoxy, aryloxy, siloxy or amide radicals can also be used in place of the aluminoxane compounds of the general formula (IV) or (V).

The molar ratio of the metal (preferably Al) in activating compound (C) to the late transition metal (preferably Fe) of catalyst (A) usually ranges from 20,000:1 to 1:1, preferably from 1,000:1 to 1:1, and even more preferably from 500:1 to 1:1.

The molar ratio of the metal of the Ziegler catalyst component (B) to the late transition metal of catalyst component (A) to is preferably in the range from 500:1 to 1:100, more preferably from 100:1 to 1:50, and even more preferably from 50:1 to 1:1.

Both the late transition metal complex component (A) and the Ziegler catalyst component (B) and also the activating compounds (C) are preferably used in a solvent, with preference being given to aromatic hydrocarbons having from 6 to 20 carbon atoms, in particular xylenes, toluene, pentane, hexane, heptane or mixtures of these.

The catalyst components (A), (B), and (C) can be used either alone or together with further components as catalyst system for olefin polymerization. Further optional components may be one or more organic or inorganic supports (D). It is possible to feed all catalyst components (A), (B), and (C) independently to the polymerization reaction, where one or more of the components (A), (B), and (C) can also be combined with further optional components like a support or solvent. It is possible to combine first all components (A), (B), and (C), and optional further components, and feed this mixture to the polymerization reaction or to combine one or both of components (A) and (B) with activating compounds (C) and feed the resulting mixtures to the polymerization reaction. It is further possible to first combined late transition metal catalyst compound (A) and Ziegler catalyst component (B), optionally on a support or in a solvent, and feed this mixture separately from the activating compounds (C) to the polymerization reaction.

In particular, to enable the late transition metal catalyst compound (A) and the Ziegler catalyst component (B) to be used in the gas phase or in suspension in polymerization processes, it is often advantageous for the complexes to be used in the form of a solid, i.e. for them to be applied to a solid support (D). Furthermore, the supported complexes have a high productivity. The late transition metal catalyst (A) and/or the Ziegler catalysts (B) can therefore optionally be immobilized on an organic or inorganic support (D) and be used in supported form in the polymerization. This enables, for example, deposits in the reactor to be avoided and the polymer morphology to be controlled.

As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers having polar functional groups, for example copolymers of ethene and acrylic esters, acrolein or vinyl acetate.

A preferred catalyst composition to be used in the process of the invention comprises one or more support components. It is possible for both the late transition metal catalyst (A) and the Ziegler catalyst (B) to be supported, or only one of the two components can be supported. In a preferred variant, both components (A) and (B) are supported. The two components (A) and (B) can have been applied to different supports or together to a joint support. The components (A) and (B) are preferably applied to a joint support in order to ensure relative spatial proximity of the various catalyst sites and thus achieve good mixing of the different polymers formed.

To produce the catalyst systems of the invention, one of the components (A) and one of the components (B) and/or activator (C) are preferably immobilized on the support (D) by physisorption or by means of a chemical reaction, i.e. covalent bonding of the components, with reactive groups of the support surface.

The order in which support component (D), late transition metal complex (A), Ziegler catalyst (B) and the activating compound (C) are combined is in principle immaterial. After the individual process steps, the various intermediates can be washed with suitable inert solvents, e.g. aliphatic or aromatic hydrocarbons.

The late transition metal complex (A), the Ziegler catalyst (B) and the activating compound (C) can be immobilized independently of one another, e.g. in succession or simultaneously. Thus, the support component (D) can firstly be brought into contact with the activating compound or compounds (C) or the support component (D) can firstly be brought into contact with the Ziegler catalyst (B) and/or the late transition metal complex (A). Preactivation of the Ziegler catalyst (B) with one or more activating compounds (C) before mixing with the support (D) is also possible. The late transition metal component can, for example, be reacted simultaneously with the transition metal complex with the activating compound (C) or can be preactivated separately by means of this. The preactivated late transition metal complex (A) can be applied to the support before or after the preactivated Ziegler catalyst (B). In one possible embodiment, the late transition metal complex (A) and/or the Ziegler catalyst (B) can also be prepared in the presence of the support material. A further method of immobilization is prepolymerization of the catalyst system with or without prior application to a support.

The immobilization is generally carried out in an inert solvent which can be filtered off or evaporated after the immobilization. After the individual process steps, the solid can be washed with suitable inert solvents, e.g. aliphatic or aromatic hydrocarbons, and dried. The use of the still moist, supported catalyst is also possible.

In a preferred form of the preparation of the supported catalyst system, at least one late transition metal complex (A) is brought into contact with an activating compound (C) and subsequently mixed with the dehydrated or passivated support material (D). The Ziegler catalyst (B) is likewise brought into contact with at least one activating compound (C) in a suitable solvent, preferably giving a soluble reaction product, an adduct or a mixture. The preparation obtained in this way is then mixed with the immobilized late transition metal complex, which is used either directly or after separating off the solvent, and the solvent is completely or partly removed. The resulting supported catalyst system is preferably dried to ensure that the solvent is removed completely or largely from the pores of the support material. The supported catalyst is preferably obtained as a free-flowing powder. Examples of the industrial implementation of the above process are described in WO 96/00243, WO 98/40419 or WO 00/05277. A further preferred embodiment comprises firstly applying the activating compound (C) to the support component (D) and subsequently bringing this supported compound into contact with the late transition metal complex (A) and the Ziegler catalyst (B).

As support component (D), preference is given to using finely divided supports which can be any organic or inorganic solid. In particular, the support component (D) can be a porous support such as talc, a sheet silicate such as montmorillonite or mica, an inorganic oxide or a finely divided polymer powder (e.g. polyolefin or polymer having polar functional groups).

The support materials used preferably have a specific surface area in the range from 10 to 1000 m$^2$/g, a pore volume in the range from 0.1 to 5 ml/g and a mean particle size of from 1 to 500 µm. Preference is given to supports having a specific surface area in the range from 50 to 700 m$^2$/g, a pore volume in the range from 0.4 to 3.5 ml/g and a mean particle size in the range from 5 to 350 µm. Particular preference is given to supports having a specific surface area in the range from 200 to 550 m$^2$/g, a pore volume in the range from 0.5 to 3.0 ml/g and a mean particle size of from 10 to 150 µm.

The inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or under a blanket of inert gas (e.g. nitrogen), or the inorganic support can be calcined at temperatures of from 200 to 1000° C. to obtain, if appropriate, the desired structure of the solid and/or the desired OH concentration on the surface. The support can also be treated chemically using customary dessicants such as metal alkyls, preferably aluminum alkyls, chlorosilanes or SiCl$_4$ or else methylaluminoxane. Appropriate treatment methods are described, for example, in WO 00/31090.

Organic support materials such as finely divided polyolefin powders (e.g. polyethylene, polypropylene or polystyrene) can also be used and should preferably likewise be freed of adhering moisture, solvent residues or other impurities by means of appropriate purification and drying operations before use. It is also possible to use functionalized polymer supports, e.g. ones based on polystyrene, polyethylene, polypropylene or polybutylene, via whose functional groups, for example ammonium or hydroxyl groups, at least one of the catalyst components can be immobilized. Polymer blends can also be used.

Inorganic oxides suitable as support component (D) may be found in groups 2, 3, 4, 5, 13, 14, 15 and 16 of the Periodic Table of the Elements. Examples of oxides preferred as supports comprise silicon dioxide, aluminum oxide and mixed oxides of the elements calcium, aluminum, silicon, magnesium or titanium and also corresponding oxide mixtures. Other inorganic oxides which can be used either alone or in combination with the abovementioned preferred oxidic supports are, for example, MgO, CaO, AlPO$_4$, ZrO$_2$, TiO$_2$, B$_2$O$_3$ or mixtures thereof.

Further preferred inorganic support materials are inorganic halides such as MgCl$_2$ or carbonates such as Na$_2$CO$_3$, K$_2$CO$_3$, CaCO$_3$, MgCO$_3$, sulfates such as Na$_2$SO$_4$, Al$_2$(SO$_4$)$_3$, BaSO$_4$, nitrates such as KNO$_3$, Mg(NO$_3$)$_2$ or Al(NO$_3$)$_3$.

Preference is given to using silica gels as solid support materials (D) for catalysts for olefin polymerization since this material makes it possible to produce particles whose size and structure make them suitable as supports for olefin polymerization. Spray-dried silica gels, which are spherical agglomerates of smaller granular particles, viz. the primary particles, have been found to be particularly useful here. The silica gels can be dried and/or calcined before use.

The silica gels used are generally used as finely divided powders having a mean particle diameter D50 of from 5 to 200 µm, preferably from 10 to 150 µm, particularly preferably from 15 to 100 µm and more preferably from 20 to 70 µm, and usually have pore volumes of from 0.1 to 10 cm$^3$/g, preferably from 0.2 to 5 cm$^3$/g, and specific surface areas of from 30 to 1000 m$^2$/g, preferably from 50 to 800 m$^2$/g and preferably from 100 to 600 m$^2$/g. The Ziegler catalyst (A) is preferably applied in such an amount that the concentration of the transition metal from the Ziegler catalyst (A) in the finished catalyst system is from 1 to 100 µmol, preferably from 5 to 80 µmol and particularly preferably from 10 to 60 µmol, per g of support (D).

The late transition metal catalyst (A) is preferably applied in such an amount that the concentration of the late transition metal from the late transition metal catalyst (A) in the finished catalyst system is from 1 to 200 µmol, preferably from 5 to 100 µmol and particularly preferably from 10 to 70 µmol, per g of support (D). The Ziegler catalyst (B) is preferably applied in such an amount that the concentration of transition metal from the Ziegler catalyst (B) in the finished catalyst system is from 1 to 200 µmol, preferably from 5 to 100 µmol and particularly preferably from 10 to 70 µmol, per g of support (D).

At least a part of the catalyst system comprising components (A), (B), and (C), and optional further components like a support (D) is existent in the form of a particulate solid, the so-called catalyst solid. Preferably the catalyst solid comprises components (A) and (B) and, if present, support (D) or more preferably the catalyst solid comprises components (A), (B) and (C) and, if present, support (D).

It is also possible for the catalyst system firstly to be prepolymerized with 1-olefins, preferably linear C$_2$-C$_{10}$-1-alkenes and more preferably ethylene or propylene, and the resulting prepolymerized catalyst solid then to be used in the actual polymerization. The weight ratio of catalyst solid used in the prepolymerization to a monomer polymerized onto it is preferably in the range from 1:0.1 to 1:1000, preferably from 1:1 to 1:200. Furthermore, a small amount of an olefin, preferably an 1-olefin, for example vinylcyclohexane, styrene or phenyldimethylvinylsilane, as modifying component, an antistatic or a suitable inert compound such as a wax or oil can be added as additive during or after the preparation of the catalyst system. The molar ratio of additives to the sum of late transition metal catalyst (A) and Ziegler catalyst (B) is usually from 1:1000 to 1000:1, preferably from 1:5 to 20:1.

The process can be carried out using all industrially known low-pressure polymerization methods at temperatures in the range from −20 to 200° C., preferably from 25 to 150° C. and particularly preferably from 40 to 130° C., and under pressures of from 0.1 to 20 MPa and particularly preferably from 0.3 to 5 MPa. The polymerization can be carried out batchwise or preferably continuously in one or more stages. Solution processes, suspension processes, stirred gas-phase processes and gas-phase fluidized-bed processes are all possible. Processes of this type are generally known to those skilled in the art. Among the polymerization processes mentioned, gas-phase polymerization, in particular in gas-phase fluidized-bed reactors and suspension polymerization, in particular in loop reactors or stirred tank reactors, are preferred.

In a preferred embodiment of the present invention the polymerization process is a suspension polymerization in a suspension medium, preferably in an inert hydrocarbon such as isobutane or mixtures of hydrocarbons or else in the monomers themselves. Suspension polymerization temperatures are usually in the range from −20 to 115° C., preferably from 50 to 110° C. and particularly preferably from 60 to 100° C., and the pressure is in the range of from 0.1 to 10 MPa and preferably from 0.3 to 5 MPa. The solids content of the suspension is generally in the range of from 10 to 80 wt.-%. The polymerization can be carried out both batch-wise, e.g. in stirred autoclaves, and continuously, e.g. in tubular reactors, preferably in loop reactors. In particular, it can be carried out by the Phillips PF process as described in U.S. Pat. Nos. 3,242,150 and 3,248,179.

Suitable suspension media are all media which are generally known for use in suspension reactors. The suspension medium should be inert and be liquid or supercritical under the reaction conditions and should have a boiling point which is significantly different from those of the monomers and comonomers used in order to make it possible for these starting materials to be recovered from the product mixture by distillation. Customary suspension media are saturated hydrocarbons having from 4 to 12 carbon atoms, for example isobutane, butane, propane, isopentane, pentane and hexane, or a mixture of these, which is also known as diesel oil.

In a preferred suspension polymerization process, the polymerization takes place in a cascade of two or preferably three or four stirred vessels. The molecular weight of the polymer fraction prepared in each of the reactors is preferably set by addition of hydrogen to the reaction mixture. The polymerization process is preferably carried out with the highest hydrogen concentration and the lowest comonomer concentration, based on the amount of monomer, being set in the first reactor. In the subsequent further reactors, the hydrogen concentration is gradually reduced and the comonomer concentration is altered, in each case once again based on the amount of monomer.

A further, preferred suspension polymerization process is suspension polymerization in loop reactors, where the polymerization mixture is pumped continuously through a cyclic reactor tube. As a result of the pumped circulation, continual mixing of the reaction mixture is achieved and the catalyst introduced and the monomers fed in are distributed in the reaction mixture. Furthermore, the pumped circulation prevents sedimentation of the suspended polymer. The removal of the heat of reaction via the reactor wall is also promoted by the pumped circulation. In general, these reactors consist essentially of a cyclic reactor tube having one or more ascending legs and one or more descending legs which are enclosed by cooling jackets for removal of the heat of reaction and also horizontal tube sections which connect the vertical legs.

The impeller pump, the catalyst feed facilities and the monomer feed facilities and also the discharge facility, thus normally the settling legs, are usually installed in the lower tube section. However, the reactor can also have more than two vertical tube sections, so that a meandering arrangement is obtained.

The polymer is generally discharged continuously from the loop reactor via settling legs. The settling legs are vertical attachments which branch off from the lower reactor tube section and in which the polymer particles can sediment. After sedimentation of the polymer has occurred to a particular degree, a valve at the lower end of the settling legs is briefly opened and the sedimented polymer is discharged discontinuously.

Preferably, the suspension polymerization is carried out in the loop reactor at an ethylene concentration of at least 5 mole percent, preferably 10 mole percent, based on the suspension medium. In this context, suspension medium does not mean the fed suspension medium such as isobutane alone but rather the mixture of this fed suspension medium with the monomers dissolved therein. The ethylene concentration can easily be determined by gas-chromatographic analysis of the suspension medium.

In a further preferred embodiment of the present invention the polymerization process is carried out in a horizontally or vertically stirred or fluidized gas-phase reactor.

Particular preference is given to gas-phase polymerization in a fluidized-bed reactor, in which the circulated reactor gas is fed in at the lower end of a reactor and is taken off again at its upper end. When such a process is employed for the polymerization of 1-olefins, the circulated reactor gas is usually a mixture of the 1-olefins to be polymerized, inert gases such as nitrogen and/or lower alkanes such as ethane, propane, butane, pentane or hexane and optionally a molecular weight regulator such as hydrogen. The use of nitrogen or propane as inert gas, if appropriate in combination with further lower alkanes, is preferred. The velocity of the reactor gas has to be sufficiently high firstly to fluidize the mixed bed of finely divided polymer present in the tube and serving as polymerization zone and secondly to remove the heat of polymerization effectively. The polymerization can also be carried out in a condensed or super-condensed mode, in which part of the circulating gas is cooled to below the dew point and returned to the reactor separately as a liquid and a gas phase or together as a two-phase mixture in order to make additional use of the enthalpy of vaporization for cooling the reaction gas.

In gas-phase fluidized-bed reactors, it is advisable to work at pressures of from 0.1 to 10 MPa, preferably from 0.5 to 8 MPa and in particular from 1.0 to 3 MPa. In addition, the cooling capacity depends on the temperature at which the polymerization in the fluidized bed is carried out. The process is advantageously carried out at temperatures of from 30 to 160° C., particularly preferably from 65 to 125° C., with temperatures in the upper part of this range being preferred for copolymers of relatively high density and temperatures in the lower part of this range being preferred for copolymers of lower density.

It is also possible to use a multizone reactor in which two polymerization zones are linked to one another and the polymer is passed alternately a plurality of times through these two zones, with the two zones also being able to have different polymerization conditions. Such a reactor is described, for example, in WO 97/04015 and WO 00/02929.

The different or else identical polymerization processes can also, if desired, be connected in series and thus form a polymerization cascade. A parallel arrangement of reactors using two or more different or identical processes is also possible. However, the polymerization is preferably carried out in a single reactor.

The method of the present invention is characterized in that at least one specific modifier is added to the polymerization reaction for controlling the polymer composition.

The modifier is either an alkyl alkoxy silane or a dialkyl ether or the modifier is a saturated halogenated hydrocarbon. Alkyl alkoxy silanes or dialkyl ethers are employed for increasing the relative portion of the ethylene copolymer component obtained from polymerization by late transition metal catalyst component (A), compared to the polymer composition of the ethylene copolymer obtained with the same catalyst system under the same polymerization conditions without utilizing the alkyl alkoxy silane or the dialkyl ether. Saturated halogenated hydrocarbons are employed for increasing the relative portion of the ethylene copolymer component obtained from polymerization by Ziegler catalyst component (B), compared to the polymer composition of the ethylene copolymer obtained with the same catalyst system under the same polymerization conditions without utilizing the saturated halogenated hydrocarbon. By selecting the appropriate modifier and varying the amount, in which it is added to the polymerization, it is possible to control the polymerization process and especially the composition of the obtained ethylene copolymer. It is also possible to add mixture of modifiers for controlling the polymer composition of the ethylene copolymer, for example mixtures of more than one alkyl alkoxy silane, mixtures of more than one dialkyl ether, mixtures comprising at least one alkyl alkoxy silane and at least one dialkyl ether or mixtures of more than one saturated halogenated hydrocarbon.

According to the present invention, the alkyl alkoxy silane, the dialkyl ether, the saturated halogenated hydrocarbon or a mixture of these modifiers is preferably added in an amount of from 0.1 to 100 mol/kg catalyst solid, more preferably in an amount of from 0.5 to 75 mol/kg catalyst solid and in particular in an amount of 2 to 50 mol/kg catalyst solid.

Preferred alkyl alkoxy silanes, which are suitable as modifiers in the method of the present invention, are compounds of the general formula (VI)

$$R^1_n Si(OR^2)_{4-n} \quad \text{(VI)}$$

wherein the radicals $R^1$ are identical or different and are each $C_1$-$C_{20}$-alkyl or 5- to 7-membered cycloalkyl which in turn may be substituted by $C_1$-$C_{10}$-alkyl, the radicals $R^2$ are identical or different and are each $C_1$-$C_{20}$-alkyl and n is the integer 1, 2 or 3. Particularly preferred compounds are those in which $R^1$ is $C_1$-$C_8$-alkyl or 5- to 7-membered cycloalkyl, $R^2$ is $C_1$-$C_4$-alkyl and n is 1 or 2. Very preferred representatives of these compounds are diisopropyldimethoxysilane, isobutylisopropyldimethoxysilane, diisobutyldimethoxysilane, dicyclopentyldimethoxysilane, dicyclopentyldiethoxysilane, dicyclohexyldimethoxysilane, cyclohexylmethyldimethoxysilane, cyclohexylmethyldiethoxysilane, isopropyl-tert-butyldimethoxysilane, isobutyl-sec-butyldimethoxysilane, isopropyl-sec-butyldimethoxysilane, t-hexyltrimethoxysilane or t-hexyltriethoxysilane.

Preferred dialkyl ethers, which are suitable as modifiers in the method of the present invention, are represented by the general formula (VII)

$$R^3\text{—O—}R^4 \quad \text{(VII)}$$

wherein $R^3$ and $R^4$ are independent of each other a primary, secondary or tertiary alkyl having from 1 to 10 carbon atoms or $R^3$ and $R^4$ are joined and form together with the oxygen atom a ring having from 1 to 10 carbon atoms. Preferably $R^3$ and $R^4$ are selected from the group consisting of methyl, ethyl, propyl, n-butyl, isobutyl, tert-butyl, n-pentyl and n-hexyl. It is also preferred that $R^3$ and $R^4$ together with the oxygen atom form a 5-, 6- or 7-membered ring which can further be substituted by one or more $C_1$-$C_6$-alkyl groups and in such a case it is especially preferred if $R^3$ and $R^4$ together are a —$C_4H_8$—, a —$C_5H_{10}$—, or a —$C_6H_{12}$— group. Very preferred representatives of these compounds are diethyl ether, methyl tert-butyl ether or tetrahydrofuran.

Preferred saturated halogenated hydrocarbons, which are suitable as modifiers in the method of the present invention, are monohalogen and polyhalogen substituted aliphatic and alicyclic hydrocarbons having from 1 to 20 carbon atoms, preferably from 2 to 12 carbon atoms. Preferably the number of halogens atoms in the saturated halogenated hydrocarbons is 1 or 2. It is further preferred that the halogen radicals are bound to secondary or tertiary carbon atoms. Especially preferred are saturated halogenated hydrocarbons in which the halogen is chlorine, bromine or iodine. Very preferred representatives of these compounds are chloroethane; bromoethane; iodoethane; 1,1-dichloroethane; 1,1-dibromoethane; 1,1-diiodoethane; 1,2-dichloroethane; 1,2-dibromoethane; 1,2-diiodoethane; 1-brom-1-chloroethane; 1-bromo-1-iodoethane; 1-chloro-1-iodoethane; 1-brom-2-chloroethane; 1-bromo-2-iodoethane; 1-chloro-2-iodoethane; 1-bromopropane; 1-chloropropane; 1-iodopropane; 2-fluoropropane; 2-bromopropane; 2-chloropropane; 2-iodopropane; 1,3-dibromopropane; 1,3-dichloropropane; 1,3-diiodopropane; 1-bromobutane; 1-chlorobutane; 1-iodobutane; 2-bromobutane; 2-chlorobutane; 2-iodobutane; 1-bromo-2-methylpropane; 1-chloro-2-methylpropane; 1-iodo-2-methylpropane; 2-bromo-2-methylpropane; 2-chloro-2-methylpropane; 2-iodo-2-methylpropane; 1-bromopentane; 1-chloropentane; 1-iodopentane; 2-bromopentane; 2-chloropentane; 2-iodopentane; 3-bromopentane; 3-chloropentane; 3-iodopentane; 1-bromo-2-methyl-butane; 1-chloro-2-methyl-butane; 1-iodo-2-methyl-butane; 1-bromo-3-methyl-butane; 1-chloro-3-methyl-butane; 1-iodo-3-methyl-butane; 2-bromo-2-methyl-butane; 2-chloro-2-methyl-butane; 2-iodo-2-methyl-butane; 1-bromo-2,2-dimethylpropane; 1-chloro-2,2-dimethylpropane; 1-iodo-2,2-dimethylpropane; cyclopropyl chloride; cyclopropyl bromide; cyclopropyl iodide; cyclobutyl chloride; cyclobutyl bromide; cyclobutyl iodide; cyclopentyl chloride; cyclopentyl bromide; cyclopentyl iodide; cyclohexyl chloride; cyclohexyl bromide; cyclohexyl iodide; 1,1-dichlorocyclobutane; 1,1-dichlorocyclopentane; 1,1-dichlorocyclohexane; cis-1,2-dichlorocyclobutane; cis-1,2-dichlorocyclopentane; cis-1,2-dichlorocyclohexane; trans-1,2-dichlorocyclobutane; trans-1,2-dichlorocyclopentane; trans-1,2-dichlorocyclohexane; 1-chloroadamantane; 1-bromoadamantane; 1-iodoadamantane; 2-chloroadamantane; 2-bromoadamantane; 2-iodoadamantane; 2-chloronorbornane; 2-bromonorbornane; 2-iodonorbomane.

According to the present invention, the composition of the ethylene copolymer can, besides being finally controlled by adding an alkyl alkoxy silane, a dialkyl ether or a saturated halogenated hydrocarbon as modifier, also be varied by other means such as adding a molecular weight regulator like hydrogen, by varying the amount of added activating compound or by varying the polymerization temperature.

The controlling method of the present invention guaranties an effective adjustment the composition of the prepared ethylene copolymers. This allows, for example, compensating for differences in the composition of different lots of a catalyst system or for different qualities of educts of the polymerization reaction or for different levels of impurities, which interact differently with the components of the catalyst system. This however also provides the possibility to intentionally altering the composition of an ethylene copolymer and preparing, for example, different grades of ethylene copolymers with one catalyst system. Transitioning from one grade to another can then take place by such altering of the composition of the ethylene.

Accordingly, one embodiment of the present invention refers to a process for copolymerizing ethylene and at least one other olefin in the presence of a polymerization catalyst system comprising
- at least one late transition metal catalyst component (A),
- at least one Ziegler catalyst component (B), and
- at least one activating compound (C)

comprising adding a alkyl alkoxy silane or a dialkyl ether in an amount of from 0.1 to 100 mol/kg catalyst solid, preferably in an amount of from 0.5 to 75 mol/kg catalyst solid and more preferably in an amount of 2 to 50 mol/kg catalyst solid.

Another embodiment of the present invention refers to a process for copolymerizing ethylene and at least one other olefin in the presence of a polymerization catalyst system comprising
- at least one late transition metal catalyst component (A),
- at least one Ziegler catalyst component (B), and
- at least one activating compound (C)

comprising adding a saturated halogenated hydrocarbon in an amount of from 0.1 to 100 mol/kg catalyst solid, preferably in an amount of from 0.5 to 75 mol/kg catalyst solid and more preferably in an amount of 2 to 50 mol/kg catalyst solid.

The present invention also provides a method for altering the polymer composition of an ethylene copolymer obtained by copolymerizing ethylene and at least one other olefin in the presence of a polymerization catalyst system comprising
- at least one late transition metal catalyst component (A),
- at least one Ziegler catalyst component (B), and
- at least one activating compound (C)

by adding a alkyl alkoxy silane or a dialkyl ether for increasing the relative portion of the ethylene copolymer component obtained from polymerization by late transition metal catalyst component (A), or by adding a saturated halogenated hydrocarbon for increasing the relative portion of the ethylene copolymer component obtained from polymerization by Ziegler catalyst component (B) and it further provides a method for transitioning from one ethylene copolymer grade to another by utilizing the method for altering the polymer composition of the ethylene copolymer.

EXAMPLES

If not otherwise indicated, all synthesis and polymerizations were carried out in an argon atmosphere. All suspending agents were washed by argon and dried through molecular sieves before being used.

The intrinsic viscosity (IV) was measured at 135° C. by means of an automatic Ubbelohde viscosimeter (Lauda PVS 1) with decaline as solvent, in accordance with standard ISO 1628-3:2003

The vinyl double bond content, i.e. the content of vinyl groups/1000 carbon atoms, was determined by means of IR in accordance with ASTM D 6248 98. The amount of vinyl groups per 1000 carbon atoms is, under the applied polymerization conditions, a measure for the proportion of the polymer, which was polymerized by the late transition metal catalyst component.

The recording of the GPC (Gel Permeation Chromatography) curves was carried out by high-temperature gel permeation chromatography using a method described in ISO 16014-1:2003(E) and ISO 16014-4:2003(E): solvent 1,2,4-trichlorobenzene (TCB), temperature of apparatus and solutions 135° C. and as concentration detector a Polymer-Char (Valencia, Paterna 46980, Spain) IR-4 infrared detector, capable for use with TCB. A WATERS Alliance 2000 equipped with the following precolumn SHODEX UT-G and separation columns SHODEX UT 806 M (3×) and SHODEX UT 807 connected in series was used. The solvent was vacuum distilled under nitrogen and was stabilized with 0.025 wt.-% of 2,6-di-tert-butyl-4-methylphenol. The flow rate used was 1 mL/min, the injection was 400 µL and polymer concentration was in the range of 0.01 wt.-%<conc.<0.05 wt.-%. The molecular weight calibration was established by using monodisperse polystyrene (PS) standards from Polymer Laboratories (now Varian Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method according to ISO 16014-2:2003(E). The Mark-Houwing parameters used were for PS: $k_{PS}$=0.000121 dL/g, $\alpha_{PS}$=0.706 and for PE $k_{PE}$=0.000406 dL/g, $\alpha_{PE}$=0.725, valid in TCB at 135° C. Data recording, calibration and calculation was carried out using NTGPC_Control_V6.3.00 and NTGPC_V6.4.05 (hs GmbH, Hauptstraβe 36, D-554370-ber-Hilbersheim), respectively.

Example 1

Preparation of 2,6-bis[1-(2-chloro-4,6-dimethylphenylimino)ethyl]pyridine iron(II) dichloride 35.0 g 2,6-diacetylpyridine (0.215 mol), 50 g of Sicapent® (phosphorus pentoxide drying agent) obtained from Merck KGaA, Darmstadt, Germany and 76.8 g (0.493 mol) 2-chloro-4,6-dimethylaniline were dissolved in 1500 mL of THF. The mixture was heated under reflux conditions for 42 hours. The mixture was subsequently filtered at 22° C. The filter cake was washed with 50 mL of THF. The solvent of the combined filtrates was distilled off. 250 mL of methanol were added and the mixture was stirred for 1 hour. A yellow suspension was formed in this way. The solid product was isolated by filtration, twice washed with 20 mL of methanol and subsequently dried.

Yield: 58.0 g (61.7%) of 2,6-bis[1-(2-chloro-4,6-dimethylphenylimino)ethyl]pyridine.

10 g of 2,6-bis[1-(2-chloro-4,6-dimethylphenylimino) ethyl]pyridine (22.81 mmol) were dissolved in 100 mL of THF. 3.86 g of FeCl$_2$*4H$_2$O (19.4 mmol) were added and the mixture was stirred for 4 h at 22° C. A blue precipitate formed. The solid product was isolated by filtration at 22° C., washed with 100 mL of pentane and subsequently dried.

Yield: 13.66 g (94%) of 2,6-bis[1-(2-chloro-4,6-dimethylphenylimino)ethyl]pyridine iron(II) dichloride.

Example 2

Preparation of Ziegler Catalyst Component

A four liter four-necked round-bottomed flask was charged with 220 g silica gel (Sylopol® 2107 obtained from Grace GmbH & Co. KG, Worms, which had previously been calcinated for 6 hours at 600° C.) and 700 mL of heptane. The temperature was raised to 50° C. Thereafter hexamethyldisilazane (1.5 mmol per gram of silica gel) obtained from Sigma-Aldrich Chemie GmbH, Steinheim, Germany was added dropwise within 3 min at 50° C. and stirred for 30 min. The liquid phase was decanted and the solid was washed with heptane (500 mL) in three portions.

330 ml of a 1 M in heptane solution of dibutylmagnesium (obtained from Sigma-Aldrich Chemie GmbH, Steinheim, Germany) were added at 22° C. within 10 minutes and then the suspension was heated to 50° C. and stirred for 60 minutes. The temperature was reduced to 22° C. and 60 mmol of tert-butyl chloride (obtained from Sigma-Aldrich Chemie GmbH, Steinheim, Germany) were added at 22° C. The temperature was increased to 50° C. and the suspension was stirred for 60 minutes.

Titanium(IV) chloride (0.15 mmol per gram of silica gel) obtained from Sigma-Aldrich Chemie GmbH, Steinheim, Germany and 30 ml of heptane were placed in a 250 mL four-necked round-bottomed glass flask and 33 mmol titanium(IV) isopropoxide (obtained from Sigma-Aldrich Chemie GmbH, Steinheim, Germany) were added dropwise within 10 minutes. The solution was stirred for 30 min, added to the suspension prepared above and stirred for 120 min at 50° C. The formed solid was isolated by filtration at 22° C. and then washed with heptane (500 ml) in three portions. The catalyst was dried under vacuum at 22° C. Yield: 442 g of a brown powder

Example 3

Preparation of Mixed Catalyst System 99.2 g of the Ziegler catalyst component prepared in Example 2 were suspended in 300 mL of toluene. 1.98 mmol of the 2,6-bis[1-(2-chloro-4,6-dimethylphenylimino)ethyl] pyridine iron(II) dichloride prepared in Example 1 were dissolved in 62.5 mL of a 30 wt.-% solution of methylaluminoxane in toluene (corresponding to 297 mmol aluminum; obtained from Albemarle Corporation, Baton Rouge, USA) and stirred for 90 min. The dark brown solution was added dropwise to the suspension of the Ziegler catalyst component in toluene at 22° C. and the catalyst was thereafter stirred for 120 min at 22° C. The solid product was isolated by filtration at 22° C., washed with 200 mL of heptane and dried under vacuum at 22° C. for 2 hours. The mixed catalyst had an iron content of 20 µmol Fe per gram of catalyst solid.

Examples 4 to 26 and Comparative Examples A and B

The polymerizations were carried out in a parallel synthesis machine ChemSpeed ASW 2000P of Chemspeed Ltd, Switzerland. Pressure blocks with 4×75 mL reactors were used for the polymerization reactions. The amounts of reagents described below are cited per individual reactor.

For each polymerization, 20 mL of heptane were charged into the reactor, which was equipped with a glass inlay, followed by 400 µL of a 1 M triisobutylaluminum solution in heptane (corresponding to 400 µmol). The employed modifier was dosed as 0.1 M solution in heptane. 2 mg of catalyst solid were added as 5 mg/mL slurry in heptane. 2 mL of 1-hexene were added. 2.5 mL of hydrogen were added via a mass flow meter. The reactor was pressurized with ethylene until a pressure of 15 bar was reached. The temperature was raised to 70° C. and the apparatus was vibrated with a Vortex speed of 800 rpm. The pressure was maintained at 15 bar, applying ethylene if required. After 60 min, the reactor was depressurized and cooled to 25° C., followed by addition of 3 mL of ethanol to quench the reaction. Thereafter the glass inlay was taken out and all volatiles removed in vacuum. The remaining white powder was subjected to polymer analysis.

Table 1 shows the results of four polymerizations carried out in parallel in one run, in which 20 µmol of the modifier were employed in Examples 4 to 6. Comparative Example A was carried out without adding a modifier.

TABLE 1

|  | Comparative Example A | Example 4 | Example 5 | Example 6 |
|---|---|---|---|---|
| Modifier | — | 1,5-Dibromo-pentane | Cyclohexyl-methyldieth-oxysilane | Cyclo-pentyl-chloride |
| Catalyst productivity [g/g] | 1430 | 1467 | 1519 | 1526 |
| IV [dl/g] | 3.2 | 5.8 | 1.6 | 6.1 |
| Vinyl groups [1/1000 C] | 1.19 | 0.84 | 1.56 | 0.39 |

Figure 1:
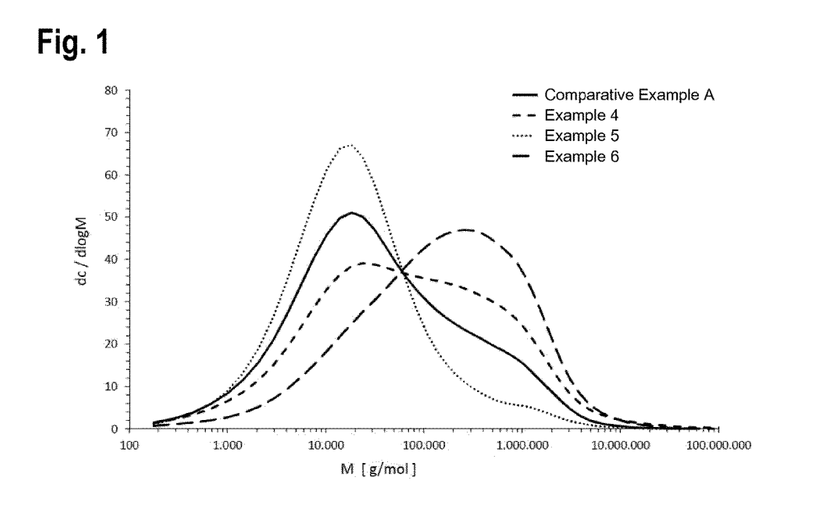
FIGS. 1 and 2 show Gel Permeation Chromatography (GPC) curves for ethylene copolymers obtained in the examples.

FIG. 1 shows the GPC curves of the obtained ethylene copolymer compositions.

The comparison of the results of Examples 4 to 6 and Comparative Example A demonstrates that it is possible to alter the composition of the ethylene copolymers drastically without reducing the over-all productivity of the catalyst system.

Table 2 depicts the results of four polymerizations carried out in parallel in one run, in which different quantities of the modifier cyclobutyl chloride were employed in Examples 7 to 9. Comparative Example B was carried out without adding a modifier.

TABLE 2

|  | Comparative Example B | Example 7 | Example 8 | Example 9 |
|---|---|---|---|---|
| Cyclobutyl chloride [µM] | 0 | 10 | 20 | 40 |
| Catalyst productivity [g/g] | 1074 | 1043 | 875 | 702 |
| IV [dl/g] | 3.0 | 4.8 | 5.1 | 7.5 |
| Vinyl groups [1/1000 C] | 1.29 | 0.96 | 0.78 | 0.53 |

Figure 2:
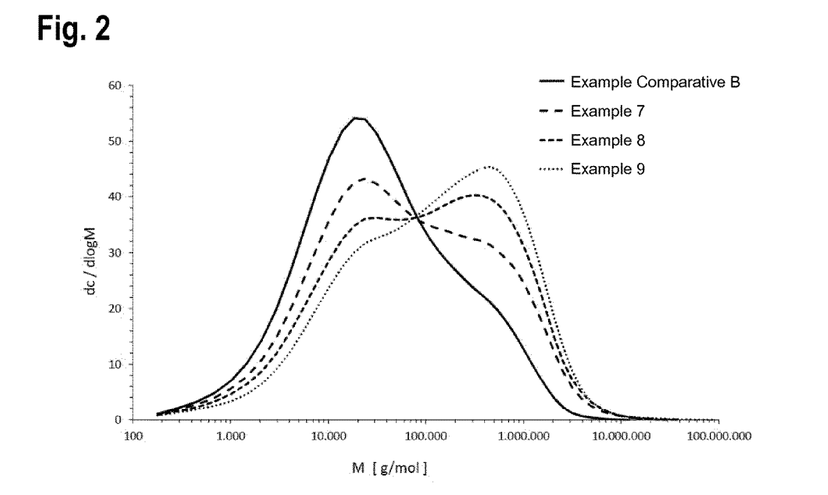

FIG. 2 shows the GPC curves of the obtained ethylene copolymer compositions.

The comparison of the results of Examples 7 to 9 and Comparative Example B demonstrates that it is possible to increase the relative portion of the ethylene copolymer component obtained from polymerization by Ziegler catalyst component (B) in a controlled manner by adding different amounts of a saturated halogenated hydrocarbon.

Table 3 shows the results of further polymerization with different modifiers according to the present invention, in which always 20 µmol of the modifier were employed. All polymerizations were carried out in parallel to a comparative example, which was carried out without utilizing a modifier. Table 3 displays the ratio of the catalyst productivity in the polymerization of the Example to the catalyst productivity in the polymerization of the comparative example, which was carried out in parallel in the same run. If further shows, as measure for the proportion of the polymer which was polymerized by the late transition metal catalyst component, the difference between the vinyl double bond content of the ethylene copolymer obtained in the Example and the vinyl double bond content of the ethylene copolymer obtained the comparative example, which was carried out in parallel in the same run.

TABLE 3

| Example | Modifier | Catalyst productivity ratio [%] | Delta vinyl groups [1/1000 C] |
|---|---|---|---|
| 10 | t-Hexyltrimethoxysilane | 77 | 0.86 |
| 11 | Dicyclopentyldiethoxysilane | 83 | 0.73 |
| 12 | Methyl tert-butyl ether | 52 | 0.45 |
| 13 | Dicyclopentyldimethoxysilane | 102 | 0.43 |
| 14 | t-Hexyltriethoxysilane | 94 | 0.36 |
| 15 | Cyclohexylmethyldimethoxysilane | 107 | 0.21 |
| 16 | 2-Chloropropane | 98 | −0.48 |
| 17 | Cyclobutyl chloride | 81 | −0.51 |
| 18 | 2-Bromoadamantane | 92 | −0.53 |
| 19 | 2-Chloronorbornane | 104 | −0.56 |
| 20 | Cyclohexyl chloride | 103 | −0.57 |
| 21 | 1,2-Dibromoethane | 81 | −0.59 |
| 22 | Cyclopentyl iodide | 100 | −0.65 |
| 23 | Cyclopentyl bromide | 114 | −0.77 |
| 24 | 2-Bromo-2-methylpropane | 95 | −0.94 |
| 25 | 1-Bromoadamantane | 94 | −0.96 |
| 26 | 2-Bromobutane | 59 | −1.09 |

What is claimed is:

1. A method of preparing an ethylene copolymer composition comprising:
   forming the ethylene copolymer composition by copolymerizing ethylene and at least one other olefin in a single stage in the presence of a polymerization catalyst system comprising:
   (i) at least one late transition metal catalyst component (A) selected from the group consisting of iron, nickel, palladium and cobalt,
   (ii) at least one Ziegler catalyst component (B), and
   (iii) at least one activating compound (C),
   wherein the ethylene copolymer composition has a vinyl group concentration per 1000 carbons of 0.96 or less,
   wherein the ethylene copolymer composition comprises a first ethylene copolymer component derived from the at least one late transition metal catalyst component (A) and a second ethylene copolymer component derived from the at least one Ziegler catalyst component (B),
   wherein the forming step further includes the step of:
   adding an alkyl alkoxy silane or a dialkyl ether, wherein the relative amount of the first ethylene copolymer component derived from the at least one late transition metal catalyst component (A) is increased relative to the second ethylene copolymer component, or adding a saturated halogenated hydrocarbon, wherein the relative amount of the second ethylene copolymer component derived from the at least one Ziegler catalyst component (B) is increased relative to the first ethylene copolymer component;
   wherein the ratio of (C) to (A) is from 20,000:1 to 1:1, and the ratio of (B) to (A) is from 500:1 to 1:100.

2. The method of claim 1, wherein the modifier is added in an amount in a range of 0.1 to 100 mol/kg based on the total weight of the catalyst system.

3. The method of claim 1, wherein the late transition metal catalyst component (A) has a tridentate ligand which bears at least two ortho, ortho'-disubstituted aryl radicals.

4. The method of claim 1, wherein the Ziegler catalyst component (B) comprises a solid component comprising a compound of titanium or vanadium, a compound of magnesium and optionally a particulate inorganic oxide.

5. The method of claim 1, wherein the polymerization is carried out in gas-phase or in suspension.

* * * * *